Patented Aug. 9, 1932

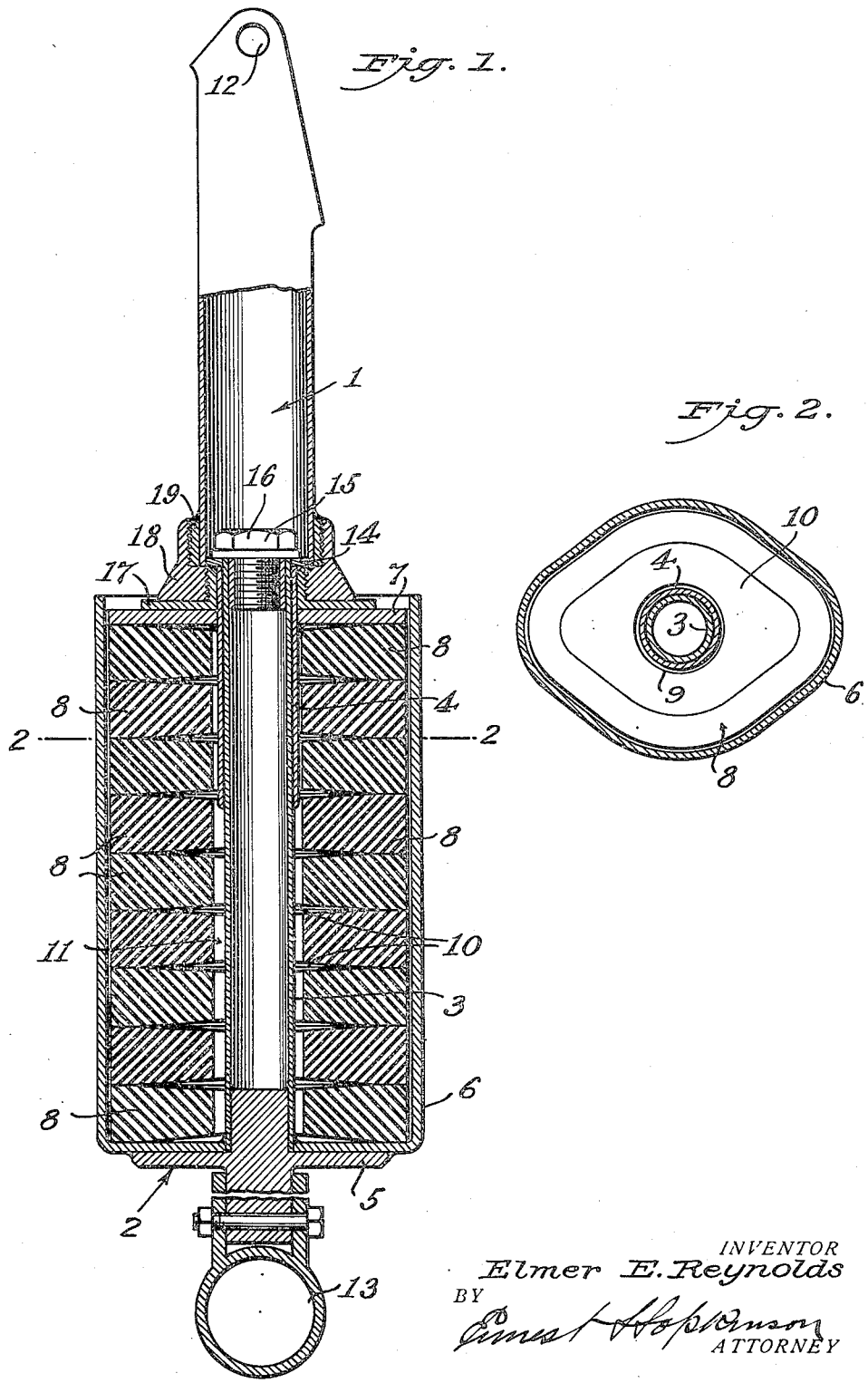

1,871,390

UNITED STATES PATENT OFFICE

ELMER E. REYNOLDS, OF DETROIT, MICHIGAN, ASSIGNOR TO THE MECHANICAL RUBBER COMPANY, OF CLEVELAND, OHIO, A CORPORATION OF NEW JERSEY

SHOCK REDUCING DEVICE

Application filed October 24, 1928. Serial No. 314,635.

This invention relates in general to cushioning devices and especially to such devices for use in airplanes to cushion shocks, as in landing.

One of the features of the invention is the provision of a series of cushioning elements of vulcanized rubber composition disposed in stacked formation and having recesses in their opposed faces, which recesses provide space for flow of the rubber under compression conditions. A pair of relatively movable members, preferably telescoping, are attached to the wheel axles and the superstructure respectively of the airplane and are adapted to compress the rubber elements bodily to cushion the action of the telescoping members. A housing confines the sides of the cushioning elements, and as the recesses provide the only space into which the rubber may flow, it is possible to regulate the stress which may be set up in the rubber by modifying the clearances provided by the recesses. By this construction it is possible to overcome the severe rebound such as occurred in former devices employing cushioning rubber, and also to positively limit the maximum deflection to any predetermined amount, irrespective of the total shock delivered to the telescoping members.

Various other features and advantages of the invention will appear upon reference to the following specification, and the accompanying drawing, in which:

Fig. 1 is a longitudinal section of a cushioning device embodying the invention;

Fig. 2 is a transverse section on the line 2—2 of Fig. 1.

Referring to the drawing which illustrates one practical embodiment of the invention, reference characters 1 and 2 designate generally two relatively movable members preferably in the form of telescoping sections including a tube 3 secured to the member 2, such as by welding or in any other suitable manner, and adapted to provide support for a sliding sleeve 4 secured to the member 1. The member 2 has a head portion 5 to which there is secured a housing 6, the walls of which extend in parallelism with the telescoping parts 3 and 4. The member 1 also has a head 7 forming in effect a plunger or abutment adapted to reciprocate within the housing 6, upon relative motion of the members 1 and 2, the head 7 being firmly secured as by welding to the member 1. A series of vulcanized rubber elements 8 preferably in the form of slabs are arranged in stacked formation within the housing 6 between the relatively movable heads 5 and 7. Each of the rubber elements 8 is provided with a central opening 9 adapted to surround and clear the telescoping parts 3 and 4 and are also provided on their opposite faces with recesses, preferably as indicated at 10, the recesses being arranged to merge with the openings 9 and being tapered in cross-section inwardly of their margins.

The housing 6 is adapted to hold all of the rubber elements in cooperating relation between the movable heads 5 and 7, the faces of the elements being in contact and the openings 9 and the recesses 10 being aligned with each other. In this way the recesses 10 and the openings 9 are intercommunicating through the passage 11 extending from the head 5 to the head 7 around the telescoping parts 3 and 4. The members 1 and 2 are provided with suitable means of connection, such as the eyes 12 and 13 disclosed in Fig. 1, whereby said members may be connected respectively to the wheels and the superstructure of an airplane. It will therefore be seen that when the airplane is traveling over rough ground or landing, that the members 1 and 2 will vibrate the heads 5 and 7 and this in turn will compress the rubber elements 8 contained within the housing 6 and also compress the air confined between the recesses 10. The margins of the rubber elements 8 are closely confined by the housing 6, so that upon compression the rubber can flow only toward the center, the initial pressure being adjacent the margins and followed by flow of the rubber toward the center into the recesses 10. It is therefore possible to produce a rubber spring whose load-deflection characteristics can be determined, and whose total movement can be limited to any desired degree by modifying the clearance provided by the recesses, thereby preventing excessive fibre stress from developing within the rubber.

In order to prevent excessive motion of the heads 5 and 7 away from each other, as in rebound of the parts after deflection, the telescoping sleeve 4 is preferably provided with a stop which may be in the form of a ring 14 secured to member 1 adjacent the end of the sleeve 4 as by welding. The ring 14 is arranged to engage a washer 15 secured to the member 2 at the end of the tube 3 by a cap screw 16. A plurality of sleeves 17, 18 and 19, preferably threaded into one another, are confined with the head 7, the sleeve 4, and the ring 14 to join and strengthen the parts, and welding may be employed to more strongly unite them together whereby the component parts of member 1 form a sliding unit. It will be seen that when the heads 5 and 7 move toward each other, the ring 14 will travel away from the washer 15, but upon movement of the heads 5 and 7 in the opposite direction, as in rebound, the ring 14 will engage the washer 15 and therefore stop further motion of the members 1 and 2.

According to the foregoing construction there is obtained a cushioning action resulting from bodily compression of the rubber and flow thereof into the spaces provided by the recesses 10, and the severe rebound heretofore occurring in absorbers employing cushioning rubber is overcome. It is also possible to limit the maximum deflection of the members 1 and 2 to any predetermined amount irrespective of the total shock delivered, and the range or degree of cushioning, by altering the size or shape of the recesses 10.

With the foregoing description it is evident that various alterations and modifications may suggest themselves to those skilled in the art without departing from the underlying principles of the invention, and it is therefore not intended to limit the invention except as defined in the appended claims.

Having thus described my invention what I claim and desire to protect by Letters Patent is:

1. A device for cushioning shocks, comprising relatively movable members, a plurality of rubber elements adapted to be compressed between said members, said rubber elements being arranged in superposed registering relation and being thicker marginally than inwardly of their margins to provide recesses inwardly of said margins for permitting ready flow of the rubber upon compression, and means for preventing flow of the rubber elements outward from their margins.

2. A device for cushioning shocks, comprising two telescoping members, one of which is shaped to hold a plurality of superposed rubber elements and the other of which is provided with an abutment movable so as to compress the rubber elements, said rubber elements being disposed with opposite faces in contacting relation and being recessed to permit the rubber to flow upon compression, thereby to enhance the cushioning property of the rubber of the elements, and a housing carried by one of said members and arranged to prevent flow of the rubber of said elements outward from the margins thereof.

3. A device for cushioning shocks, comprising two telescoping members, one of which is shaped to hold a plurality of opposed rubber elements and the other of which is provided with an abutment movable so as to compress the rubber elements, said rubber elements having openings for the telescoping members and recesses in both of their opposite faces inwardly of their margins.

4. A shock cushioning device, comprising relatively movable members, and a plurality of cooperating rubber elements adapted to be compressed by said members, said elements each consisting of rubber composition and having their opposite faces provided with recesses disposed inward of their margins, and means for holding said elements by their margins in stacked formation between said members and with said recesses in opposition, said means being adapted to prevent flow of said rubber composition outward from said margins.

5. A shock cushioning device, comprising relatively movable members including telescoping portions, a plurality of rubber elements disposed between said members, each element having an opening disposed around the telescoping portions and also having its opposite faces provided with recesses around said opening, and means for confining said elements by their margins in position with the faces and recesses of adjacent elements disposed in opposition.

6. A shock cushioning device, comprising relatively movable members including telescoping sections, a plurality of relatively flat rubber elements disposed between said members, each element having an opening disposed around said telescoping sections and also having their opposite faces provided with correspondingly shaped recesses communicating with said opening, and a housing confining said elements by their margins in position with the openings aligned and clear of said telescoping sections and with the faces and recesses of adjacent elements disposed in opposed cooperating relation.

7. A shock cushioning device, comprising relatively movable members slidingly connected together, a plurality of rubber elements disposed in opposed relation and adapted to be compressed by said members, each of said elements having a centrally disposed opening and a recess in each of its opposed sides, the recesses being disposed around said opening, one of said members carrying a housing arranged to prevent flow of said rubber elements outward from their margins and to dispose the openings and recesses in alinement around the sliding members, and means for limiting movement of said sliding members away from each other.

8. A device for cushioning shocks, comprising relatively movable members, a plurality of superposed rubber elements carried between said members, said rubber elements being disposed with opposite annular faces in contacting relation, and being thicker marginally, than inward of their margins, to provide recesses inwardly of said margins, and between said faces for permitting ready flow of the rubber upon compression, and means for preventing flow of the rubber elements outward from their margins.

9. A device for cushioning shocks, comprising relatively movable members, a plurality of superposed rubber elements carried between said members, said rubber elements being disposed with opposite annular faces in contacting relation and being recessed to permit the rubber to flow upon compression, and means for preventing flow of the rubber elements outward from their margins.

Signed at Detroit, county of Wayne, State of Michigan, this 10 day of October, 1928.

ELMER E. REYNOLDS.